United States Patent
Oh et al.

(10) Patent No.: US 11,302,977 B2
(45) Date of Patent: Apr. 12, 2022

(54) SECONDARY BATTERY PACK HAVING CONNECTION SLOT

(71) Applicant: LG CHEM, LTD., Seoul (KR)

(72) Inventors: Jung-Ho Oh, Daejeon (KR);
Byung-Dae Park, Daejeon (KR);
Ju-Hwan Baek, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 130 days.

(21) Appl. No.: 16/134,244

(22) Filed: Sep. 18, 2018

(65) Prior Publication Data

US 2019/0097188 A1  Mar. 28, 2019

(30) Foreign Application Priority Data

Sep. 25, 2017  (KR) .................... 10-2017-0123432

(51) Int. Cl.
*H01M 50/20* (2021.01)
*H01M 10/04* (2006.01)
(Continued)

(52) U.S. Cl.
CPC ....... *H01M 50/20* (2021.01); *H01M 10/0436* (2013.01); *H01M 10/425* (2013.01);
(Continued)

(58) Field of Classification Search
CPC .... H01M 2/1016; H01M 10/425; H01M 2/30; H01M 10/0436; H01M 2200/00; H02J 7/0026
See application file for complete search history.

(56) References Cited

U.S. PATENT DOCUMENTS

2004/0251872 A1  12/2004  Wang et al.
2005/0175889 A1*  8/2005  Han .................. H01M 10/0436
                                                             429/61
(Continued)

FOREIGN PATENT DOCUMENTS

JP         2002-245997 A    8/2002
KR    10-2009-0026650 A    3/2009
(Continued)

*Primary Examiner* — Victoria H Lynch
(74) *Attorney, Agent, or Firm* — Morgan, Lewis & Bockius LLP

(57) ABSTRACT

Disclosed is a secondary battery pack capable of improving process efficiency and reducing manufacture costs. The secondary battery pack includes a battery cell having an electrode terminal formed at a top end of a battery case; a protection circuit module having a battery cell connection terminal; and at least two terminal connection units having one end connected to the electrode terminal of the battery cell and the other end contacted and electrically connected to the battery cell connection terminal of the protection circuit module, wherein the battery case includes a battery can having an open top portion into which the electrode assembly is inserted, and a cap assembly coupled to the open top portion of the battery can, and wherein the cap assembly includes a body plate, and a connection slot is formed at a top surface of the body plate so that a portion of the terminal connection unit is inserted and accommodated therein to be electrically connected to the electrode terminal.

9 Claims, 6 Drawing Sheets

(51) Int. Cl.
     *H02J 7/00*         (2006.01)
     *H01M 10/42*      (2006.01)
     *H01M 50/543*     (2021.01)

(52) U.S. Cl.
     CPC ......... *H01M 50/543* (2021.01); *H02J 7/0026* (2013.01); *H01M 2200/00* (2013.01)

(56) References Cited

U.S. PATENT DOCUMENTS

| | | | |
|---|---|---|---|
| 2009/0130554 A1* | 5/2009 | Jang | H01M 2/34 429/179 |
| 2010/0055560 A1* | 3/2010 | Jang | H01M 2/22 429/163 |
| 2011/0003180 A1* | 1/2011 | Lee | H01M 2/021 429/7 |
| 2013/0230746 A1* | 9/2013 | Byun | H01M 2/1061 429/7 |
| 2014/0356687 A1* | 12/2014 | Heo | H01M 2/30 429/121 |
| 2015/0050534 A1* | 2/2015 | Kumagai | H01M 50/147 429/90 |
| 2016/0133911 A1 | 5/2016 | Kim | |
| 2017/0117729 A1* | 4/2017 | Hirose | A63F 13/90 |

FOREIGN PATENT DOCUMENTS

| | | |
|---|---|---|
| KR | 10-2015-0134128 A | 12/2015 |
| KR | 10-2016-0013638 A | 2/2016 |
| KR | 10-2016-0021511 A | 2/2016 |
| KR | 10-1770331 B1 | 9/2017 |
| KR | 10-1794943 B1 | 11/2017 |

* cited by examiner

SECONDARY BATTERY PACK HAVING CONNECTION SLOT

TECHNICAL FIELD

The present application claims priority to Korean Patent Application No. 10-2017-0123432 filed on Sep. 25, 2017 in the Republic of Korea, the disclosures of which are incorporated herein by reference.

The present disclosure relates to a secondary battery pack having a connection slot, and more particularly, to a secondary battery pack capable of improving process efficiency and reducing manufacture costs.

BACKGROUND ART

In recent years, demand for portable electronic products such as notebook computers, video cameras and portable telephones has rapidly increased, and also electric vehicles, energy storage batteries, robots and satellites have been developed in earnest. For this reason, a high performance secondary battery allowing repeated charging and discharging is being studied actively.

Secondary batteries currently commercialized include nickel cadmium batteries, nickel hydrogen batteries, nickel zinc batteries, lithium secondary batteries and so on. Among them, the lithium secondary batteries are more highlighted in comparison to nickel-based secondary batteries due to advantages such as free charging and discharging, caused by substantially no memory effect, very low self-discharge rate, and high energy density.

The lithium secondary battery mainly uses lithium-based oxides and carbonaceous materials as a positive electrode active material and a negative electrode active material, respectively. The lithium secondary battery includes an electrode assembly in which a positive electrode plate coated with the positive electrode active material and a negative electrode plate coated with the negative electrode active material are disposed with a separator being interposed therebetween, and an exterior for sealably containing the electrode assembly together with an electrolyte.

Meanwhile, the lithium secondary battery may be classified into a can-type secondary battery in which the electrode assembly is included in a metal can and a pouch-type secondary battery in which the electrode assembly is included in a pouch made of aluminum laminate sheets, depending on the shape of the battery case. In addition, the can-type secondary battery may be further classified into a cylindrical battery and a rectangular battery depending on the shape of the metal can. The exterior of the rectangular or cylindrical secondary battery has case with an open end, namely a battery can and a cap assembly hermetically sealed to the open end of the battery case.

Among them, the rectangular secondary battery is widely used because it has a variety of advantages such as a rectangular parallelepiped shape that allow a plurality of secondary batteries to be easily stacked.

The secondary battery has various combustible materials therein, which may explode or fire due to overcharging, overcurrent and other physical external impacts, thereby exhibiting a serious disadvantage in safety. Thus, the lithium secondary battery includes a protection circuit module (PCM) that is electrically connected to the battery cell to effectively control abnormal conditions such as overcharging.

In the prior art, the protection circuit module is coupled and connected to the battery cell by welding or soldering. For example, a clad serving as a connection member is attached to a positive electrode terminal of the battery cell, and then a nickel metal plate is welded the positive electrode terminal of the PCM and the clad, respectively, to electrically connect the protection circuit module to the battery cell, thereby manufacturing a secondary battery pack.

However, as the connection member (for example, the clad) is applied, the material cost increases, and it is very difficult to weld the connection member due to its very small size. Further, it is necessary to perform the welding operation two times in order to connect the connection member to a top end of the battery cell and a connection member connected to the protection circuit module, respectively. As a result, the production rate of the secondary battery pack is lowered and the production cost is increased.

DISCLOSURE

Technical Problem

The present disclosure is designed to solve the problems of the related art, and therefore the present disclosure is directed to providing a secondary battery pack capable of improving process efficiency and reducing manufacture costs.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a secondary battery pack, comprising: a battery cell having an electrode assembly sealed in a battery case together with an electrolyte, the battery cell having an electrode terminal formed at a top end thereof a protection circuit module having a protection circuit board at which a protection circuit is formed, and a battery cell connection terminal formed at a lower surface of the protection circuit board; and at least two terminal connection units having one end connected to the electrode terminal of the battery cell and the other end contacted and electrically connected to the battery cell connection terminal of the protection circuit module.

Here, the battery case may include a battery can having an open top portion into which the electrode assembly is inserted, and a cap assembly coupled to the open top portion of the battery can.

Also, the cap assembly may include a body plate, and a connection slot may be formed at a top surface of the body plate so that a portion of the terminal connection unit is inserted and accommodated therein to be electrically connected to the electrode terminal.

Further, the body plate may be an electrically conductive metal plate. In addition, the connection slot may be formed integrally with the body plate by using the same material.

In addition, the connection slot may include a sidewall whose lower portion is connected to the top surface of the body plate, and an upper wall connected to a top end of the sidewall.

Also, an opening may be formed at one side of the connection slot so that a portion of the terminal connection unit is inserted therein.

Further, the electrode terminal may include a first electrode terminal and a second electrode terminal. Specifically, the first electrode terminal may have a protruding structure protrusively extending through the opening formed in the body plate, and the second electrode terminal may serve as the top surface of the body plate.

In addition, the terminal connection unit may include a first terminal connection unit and a second terminal connection unit.

Also, the battery cell connection terminal of the protection circuit module may include a first battery cell connection terminal and a second battery cell connection terminal.

Further, the first terminal connection unit may have one end electrically connected to the first electrode terminal of the battery cell and the other end electrically connected to the first battery cell connection terminal of the protection circuit module.

In addition, the second terminal connection unit may have one end electrically connected to the second electrode terminal of the battery cell and the other end electrically connected to the second battery cell connection terminal of the protection circuit module.

Also, the second terminal connection unit may include a PCM connection lead contacted and electrically connected to the second battery cell connection terminal of the protection circuit module; a support portion vertically bent downwards from an end of the PCM connection lead; and a battery cell connection lead bent from the support portion and extending horizontally to be inserted through the opening of the connection slot.

In addition, an uneven structure protruding downwards may be formed at an inner lower surface of the upper wall of the connection slot.

Also, protrusions protruding upwards may be formed at an upper surface of the battery cell connection lead.

Further, a slope structure may be formed inside the connection slot so that a height of the lower surface gradually increases in a direction along which the battery cell connection lead is inserted, and a flat portion may be formed at an end portion of the slope structure in the direction along which the battery cell connection lead is inserted.

In addition, a convex portion protruding toward a center may be formed at an inner surface of the sidewall of the connection slot, and an inwardly concave hooking groove may be formed at an outer circumference of the battery cell connection lead so that the convex portion is inserted and fixed therein.

Also, at least a portion of the outer circumference of the battery cell connection lead may have a curve, and the hooking groove may be formed to be connected to the curve.

Further, the battery cell connection lead may be connected to an inner surface of the connection slot by hot-pressing or welding.

In addition, an inner surface of the connection slot and the battery cell connection lead may be fixed by means of a conductive adhesive material.

Advantageous Effects

According to an embodiment of the present disclosure, in the secondary battery pack, even though a separate connection member is not added, a portion of the terminal connection unit of the protection circuit module is inserted into the connection slot and electrically connected to the protection circuit module and the battery cell, thereby reducing the material cost. Also, the welding process for coupling the connection member may be omitted, it is possible to shorten the manufacturing time.

Also, according to an embodiment of the present disclosure, in the secondary battery pack, the connection slot is formed integrally with the body plate, instead of omitting a separate connection member, and thus it is possible to fundamentally prevent the occurrence of resistance caused by inferior bonding of the conventional connection member.

Moreover, according to an embodiment of the present disclosure, since the uneven structure of the connection slot may be contacted or pressed on one surface of the battery cell connection lead of the inserted second terminal connection unit, it is possible to ensure a more reliable electrical connection.

In addition, according to an embodiment of the present disclosure, when a hot-press method or a bonding method such as welding is applied, the heat added to the connection slot may be effectively transferred to the battery cell connection lead by means of the uneven structure of the connection slot, and thus the bonding process may be efficiently performed and more reliable coupling may be achieved.

Also, according to an embodiment of the present disclosure, since the protrusions are formed on the battery cell connection lead, the battery cell connection lead may contact or press the inner surface of the connection slot to provide a more reliable electrical connection.

Moreover, according to an embodiment of the present disclosure, since the slope structure formed inside the connection slot allows the lower and upper surfaces of the battery cell connection lead to be in close contact with the inner surface of the connection slot, it is easy to perform a reliable electric connection and a high-quality coupling process.

In addition, according to an embodiment of the present disclosure, since the position of the protection circuit module may be fixed by the coupling structure of the convex portion and the hooking groove, the protection circuit module may be easily formed at a regular position on the body plate. Also, since it is possible to prevent the inserted battery cell connection lead from being detached from the connection slot during the coupling process, the coupling process is facilitated.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
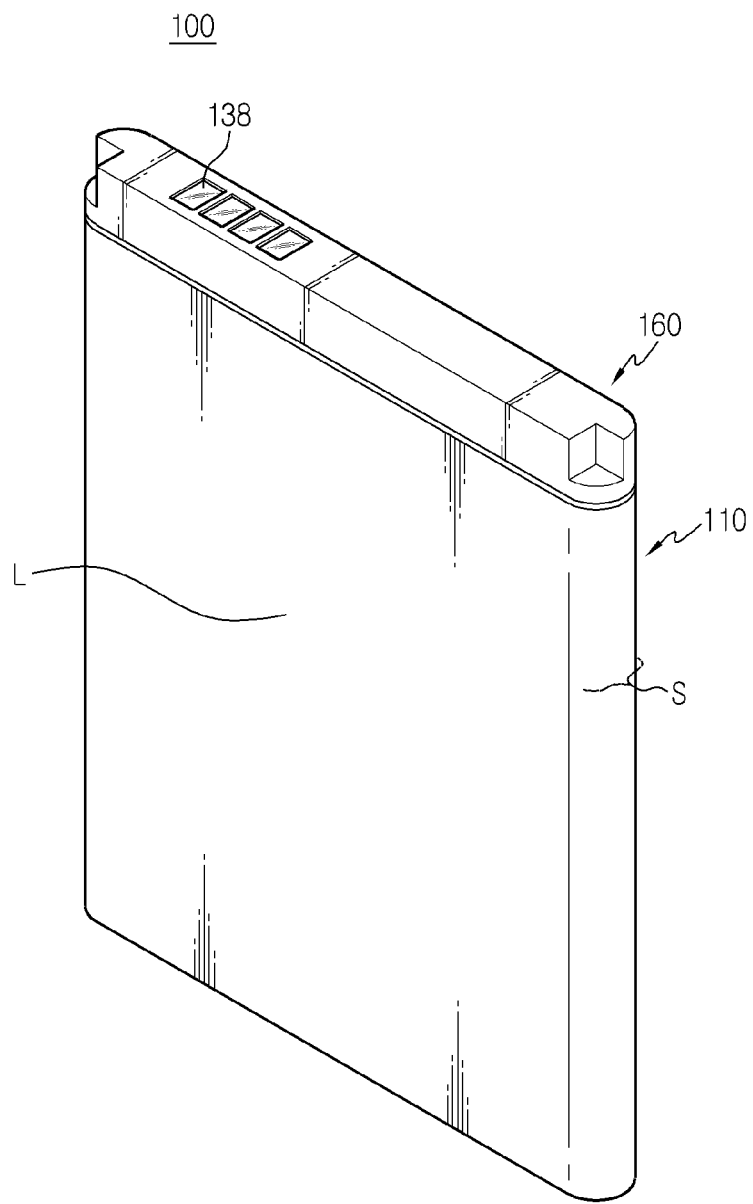
FIG. 1 is a perspective view schematically showing a secondary battery pack according to an embodiment of the present disclosure.

FIG. 1 is a perspective view schematically showing a secondary battery pack according to an embodiment of the present disclosure. Also, FIG. 2 is an exploded perspective view showing some components of the secondary battery pack according to an embodiment of the present disclosure.

Figure 2:
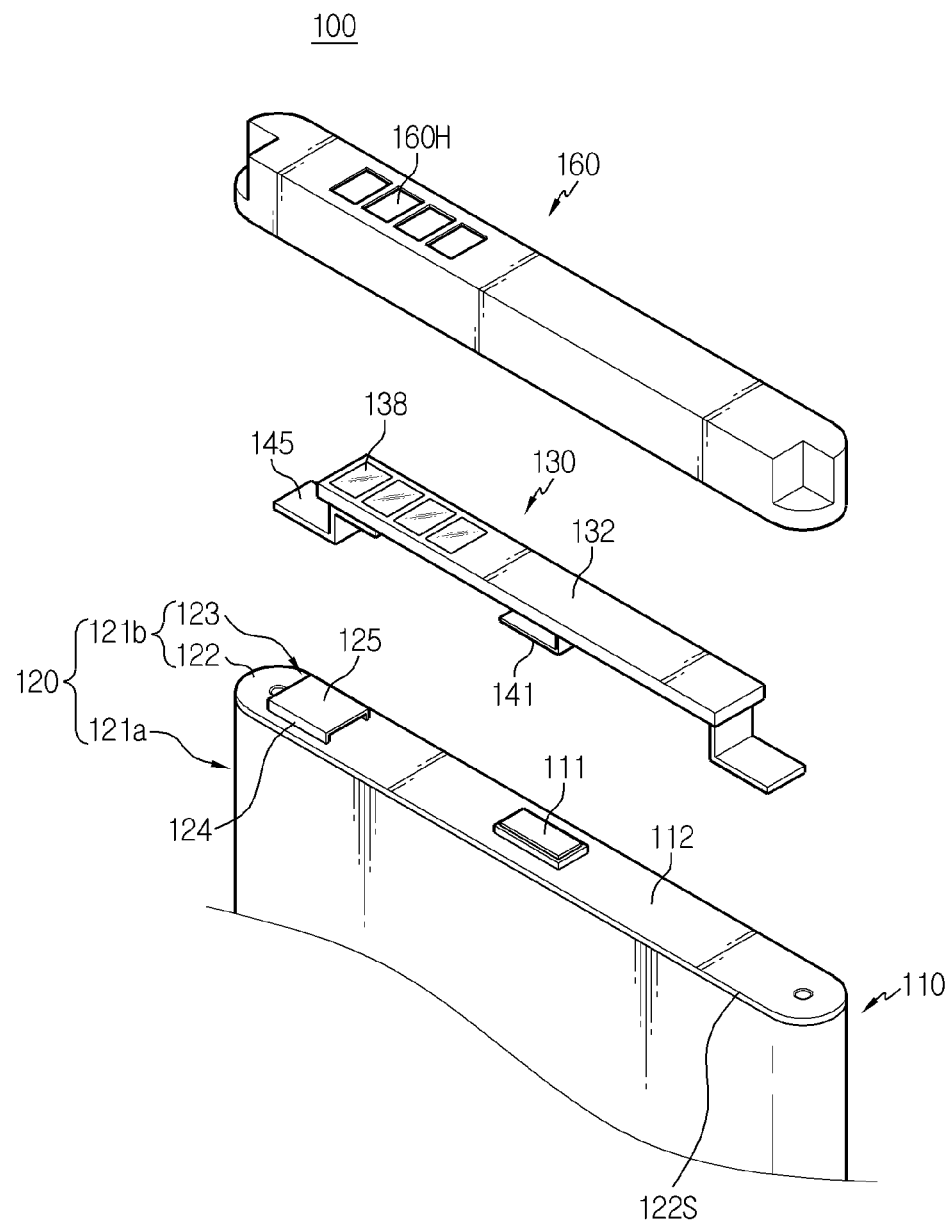
FIG. 2 is an exploded perspective view showing some components of the secondary battery pack according to an embodiment of the present disclosure.

Referring to FIGS. 1 and 2, a secondary battery pack 100 according to an embodiment of the present disclosure may include a battery cell 110, a protection circuit module 130, and terminal connection units 141, 145.

Here, in the battery cell 110, an electrode assembly may be sealed inside a battery case 120 together with an electrolyte, and electrode terminals 111, 112 may be formed at a top end thereof.

Specifically, the battery cell 110 according to an embodiment of the present disclosure may have two long sides L and two short sides S. Here, the long side L means a portion having a relatively longer length than the short side S. In other words, the short side S means a portion having a relatively shorter length than the long side L.

The electrode assembly includes a positive electrode plate and a negative electrode plate, which are arranged to face each other, and a separator may be interposed between the positive electrode plate and the negative electrode plate. In the electrode assembly, a plurality of positive electrode plates and negative electrode plates may be stacked with a separator being interposed therebetween, or one positive electrode plate and one negative electrode plate may be wound with a separator being interposed therebetween. Meanwhile, even though the present disclosure is illustrated and explained based on a rolled electrode assembly, the present disclosure is not limited to such an electrode assembly.

The electrode plates (the positive electrode plate and the negative electrode plate) of the electrode assembly are formed by applying active material slurry to a current collector. The slurry may be generally formed by stirring a granular active material, a conducting agent, a binder and a plasticizer, in a state where a solvent is added thereto.

In addition, each of the electrode plates may have an uncoated portion where no slurry is applied, and an electrode tab corresponding to each electrode plate may be formed at the uncoated portion. One or more electrode tabs, namely one or more positive electrode tabs and one or more negative electrode tabs, may be formed at the positive electrode plate and the negative electrode plate, respectively. The positive electrode tab or the negative electrode tab may be attached to the positive electrode plate or the negative electrode plate, respectively, to protrude therefrom, and may be made of the same material as the positive electrode current collector or the negative electrode current collector, respectively.

One of the electrode tabs may be electrically connected to an electrode terminal 111, explained later, and the other may be electrically connected to a body plate 122, explained later. For example, if the positive electrode tab is electrically connected to the electrode terminal 111, the electrode terminal 111 exhibits positive polarity, and the negative electrode tab is electrically connected to the body plate 122, so that the body plate 122 or a battery can 121a exhibits negative polarity.

On the contrary, if the negative electrode tab is electrically connected to the electrode terminal 111, the electrode terminal 111 exhibits negative polarity, and the positive electrode tab is electrically connected to the body plate 122, so that the body plate 122 or the battery can 121a exhibits positive polarity.

More specifically, the electrode terminal may include a first electrode terminal 111 and a second electrode terminal 112.

For example, as shown in FIG. 2, the first electrode terminal 111 may have a protruding structure that protrusively extends through an opening (not shown) formed in the body plate 122. Also, for example, as shown in FIG. 2, the second electrode terminal 112 may serve as a top surface of the body plate 122. In addition, the first electrode terminal 111 may be a negative electrode terminal electrically connected to the negative electrode tab, and the second electrode terminal 112 may be a positive electrode terminal electrically connected to the positive electrode tab.

In addition, the battery can 121a gives a space for accommodating the electrode assembly and electrolyte therein. Moreover, the battery can 121a may be made of a general metal plate known in the art, for example a conductive metal such as aluminum, stainless steel, or alloys thereof, without being limited thereto.

For example, the battery can 121a may be fabricated by deep-drawing a metal plate or by various other methods. The material of the battery can 121a of the battery cell 110 and its fabricating method are well known in the art and thus not described in detail here.

Meanwhile, the protection circuit module 130 may include a protection circuit board 132 having a protection circuit for preventing overheating, overcurrent, and the like.

Specifically, the protection circuit board 132 may include a protection element. For example, the protection element may be a positive temperature coefficient (PCT) thermistor element, a thermal cut-off (TCO) element, or the like.

Figure 3:
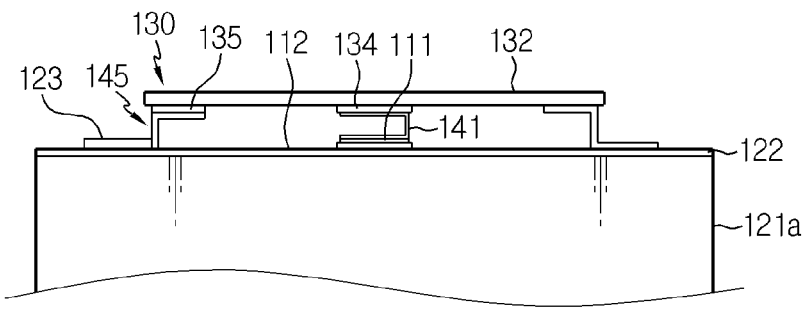
FIG. 3 is a front view showing some components of the secondary battery pack according to an embodiment of the present disclosure.

FIG. 3 is a front view showing some components of the secondary battery pack according to an embodiment of the present disclosure.

Referring to FIG. 3, battery cell connection terminals 134, 135 may be formed at the lower surface of the protection circuit board 132.

Specifically, the battery cell connection terminals 134, 135 may be configured to indirectly electrically connect the first electrode terminal 111 or the second electrode terminal 112 of the battery cell 110 to the protection circuit board 132. Furthermore, the battery cell connection terminals 134, 135 of the protection circuit module 130 may include a first battery cell connection terminal 134 and a second battery cell connection terminal 135.

Here, the first battery cell connection terminal 134 may be configured such that the protection circuit module 130 is connected to the first electrode terminal 111 or the second electrode terminal 112 of the battery cell 110.

For example, the first battery cell connection terminal 134 is configured such that the protection circuit board 132 is connected to the first electrode terminal 111 of the battery cell 110, and the first battery cell connection terminal 134 may be electrically connected to the first electrode terminal 111 that serves as a negative electrode terminal of the battery cell 110.

Also, the second battery cell connection terminal 135 may be configured such that the protection circuit board 132 is electrically connected to the second electrode terminal 112 of the battery cell 110. For example, the second battery cell connection terminal 135 may be electrically connected to the second electrode terminal 112 that serves as a positive electrode terminal of the battery cell 110.

In addition, the first battery cell connection terminal 134 may be formed at a lower surface of the center of the protection circuit board 132. Further, the second battery cell connection terminal 135 may be located at a position biased to one side from the center of the protection circuit board 132, or at lower surfaces of both sides based on the center.

Meanwhile, the terminal connection unit may include a first terminal connection unit 141 and a second terminal connection unit 145.

For example, as shown in FIG. 3, the first terminal connection unit 141 may have one end electrically connected to the first electrode terminal 111 of the battery cell 110 and the other end electrically connected to the first battery cell connection terminal 134 of the protection circuit module 130.

In addition, for example, as shown in FIG. 3, the second terminal connection unit 145 may have one end electrically connected to the second electrode terminal 112 of the battery cell 110 and the other end electrically connected to the second battery cell connection terminal 135 of the protection circuit module 130.

Referring to FIGS. 1 and 2 again, the secondary battery pack 100 according to an embodiment of the present disclosure may include a top cap 160 made of an insulating material and configured to cover an upper portion of the battery cell 110.

The top cap 160 may have an opening so that an external input/output terminal 138 of the protection circuit module 130 is exposed to the outside. For example, as shown in FIG. 2, the top cap 160 is positioned at the upper portion of the protection circuit module 130 and configured to cover the top portion of the battery cell 110. For example, the top cap 160 have four openings 160H formed at positions corresponding to the four external input/output terminals 138 formed at the protection circuit module 130.

Referring to FIGS. 2 and 3 again, the battery case 120 may include a battery can 121a. Specifically, the battery can 121a may have an opening formed at a top end thereof so that the electrode assembly (not shown) is inserted therein.

Moreover, the battery can 121a may be an electrically conductive metal plate. For example, the metal plate may be aluminum or an aluminum alloy.

In addition, the battery case 120 may include a battery can 121a and a cap assembly 121b.

Here, the cap assembly 121b may include a body plate 122.

In addition, the body plate 122 may be provided to be coupled to the open top portion of the battery can 121a. For example, the body plate 122 may have an outer peripheral portion 122S that is coupled to the top surface of the battery can 121a.

Figure 4:
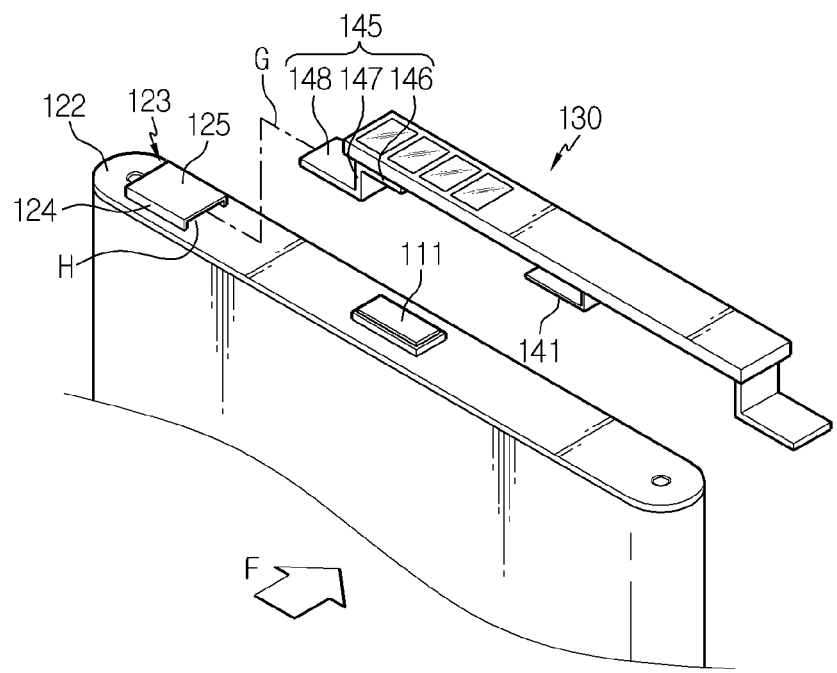
FIGS. 4 and 5 are partial perspective views for illustrating some processes of installing a protection circuit module of the secondary battery pack according to an embodiment of the present disclosure to a battery cell.
Figure 5:
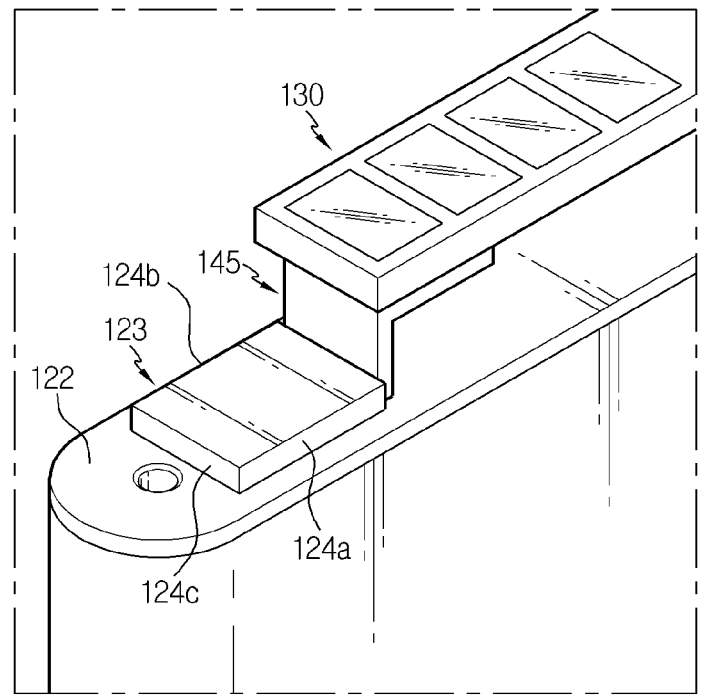

FIGS. 4 and 5 are partial perspective views for illustrating some processes of installing a protection circuit module of the secondary battery pack according to an embodiment of the present disclosure to a battery cell.

Referring to FIGS. 3 to 5, a connection slot 123 may be formed at the top surface of the body plate 122.

Here, the connection slot 123 may be configured such that a portion of the terminal connection units 141, 145 is inserted and accommodated therein to be electrically connected to the electrode terminals 111, 112. For example, the connection slot 123 may be formed at the top surface of the body plate 122 serving as the second electrode terminal 112.

That is, as shown in FIGS. 4 and 5, a portion of the second terminal connection unit 145 of the protection circuit module 130 may be inserted into the connection slot 123 by moving the protection circuit module 130 coupled thereto in a G direction.

In other words, as one end of the second terminal connection unit 145 comes into contact with the inner surface of the connection slot 123, the protection circuit module 130 connected to the other end of the second terminal connection unit 145 may be electrically connected to the second electrode terminal 112 of the battery cell 110.

Further, the body plate 122 may be an electrically conductive metal plate. For example, the metal plate may be aluminum or an aluminum alloy.

In addition, the connection slot 123 may be formed integrally with the body plate 122 by using the same material. In other words, the connection slot 123 may be formed by shaping a partial portion of the body plate 122, instead of attaching a separate member to the upper surface of the body plate 122.

Thus, according to this configuration of the present disclosure, even though a separate connection member is added to the battery case 120 to make an electrical connection between the protection circuit module and the electrode terminal of the battery cell, in the present disclosure, the electrode terminals 111, 112 of the battery cell 110 and the protection circuit module 130 may be electrically connected to each other without adding a separate connection member. Accordingly, in the present disclosure, it is possible to reduce the material cost and also shorten the manufacturing time since the welding process for coupling the connection member may be excluded.

Moreover, in the prior art, high electrical resistance may occur due to a bonding failure at the bonding portion of the surface of the battery case of the connection member and the terminal connection unit, which may the defect rate. Thus, in the present disclosure, instead of omitting the connection member, the connection slot is integrally formed with the body plate to fundamentally prevent resistance from being generated due to a poor connection of the existing connection member.

Referring to FIGS. 3 to 5 again, the connection slot 123 may include a sidewall 124 and an upper wall 125.

Specifically, the sidewall 124 of the connection slot 123 may be configured such that a lower portion thereof is connected to the top surface of the body plate 122. Also, the upper wall 125 may be formed to connect with the top end of the sidewall 124. For example, as shown in FIG. 5, when being observed in an F direction, a first sidewall 124a and a second sidewall 124b may be formed at front and rear sides and a third sidewall 124c may be formed at a left side. In addition, an upper wall 125 may be formed to be connected to the top ends of the first sidewall 124a, the second sidewall 124b and the third sidewall 124c.

Also, an opening H may be formed at a right side of the connection slot 123 so that a portion of the second terminal connection unit 145 is inserted therein.

That is, a portion of the second terminal connection unit 145 is inserted into the connection slot 123 through the opening H, and after the second terminal connection unit 145 is inserted, it may be prevented that the second terminal connection unit 145 moves in a left direction by means of the third sidewall 124, and also it may be prevented that the second terminal connection unit 145 moves in upper and lower directions by means of the upper wall 125 of the connection slot 123 and the lower surface of the inside thereof.

Thus, according to this configuration of the present disclosure, since the connection slot 123 may prevent the second terminal connection unit 145 from moving in the left direction and in the upper and lower directions after a portion of the second terminal connection unit 145 is inserted, it is possible to prevent the second terminal connection unit 145 from moving. Accordingly, during in the bonding process between the connection slot 123 and the second terminal connection unit 145, the process efficiency is increased and the bonding position becomes constant.

In addition, the first terminal connection unit 141 may be configured such that a bottom end thereof is located at the upper surface of the first electrode terminal 111 and is in direct contact with the first electrode terminal 111 and a top end thereof is in direct contact with the first battery cell connection terminal 134.

Referring to FIGS. 3 and 4 again, the second terminal connection unit 145 may include a PCM connection lead 146, a support portion 147 and a battery cell connection lead 148.

The PCM connection lead 146 may be configured to be contacted and connected to the second battery cell connection terminal 135 of the protection circuit module 130. To this end, the PCM connection lead 146 may have a plate form extending in the horizontal direction.

Further, the support portion 147 may be vertically bent downwards from one end of the PCM connection lead 146. In addition, at least one stepped structure 147S (FIG. 6) may be formed at the support portion 147 to absorb vibration caused by an external impact or the like.

In addition, the battery cell connection lead 148 may be bent horizontally from the support portion 147 and extended in the horizontal direction to be inserted through the opening H of the connection slot 123. At this time, the battery cell connection lead 148 may have a width equal to or smaller than the width of the opening H of the connection slot 123. In addition, the length of the battery cell connection lead 148 extending in the lateral direction may be equal to or smaller than the lateral length of the upper wall 125 of the connection slot 123.

Figure 6:
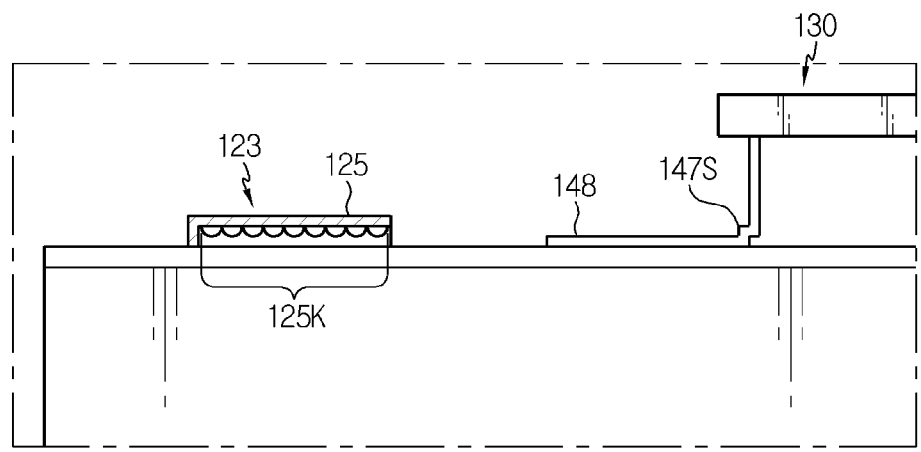
FIG. 6 is a cross-sectioned view showing a secondary battery pack according to another embodiment of the present disclosure, which is sectioned in a lateral direction.

FIG. 6 is a cross-sectioned view showing a secondary battery pack according to another embodiment of the present disclosure, which is sectioned in a lateral direction.

Referring to FIG. 6, an uneven structure 125K protruding downwards may be formed at the inner lower surface of the upper wall 125 of the connection slot 123.

Here, in the uneven structure 125K, protrusions protruding downwards from the inner lower surface of the upper wall 125 are successively connected. However, the uneven structure 125K may be configured so that protrusions 148S are spaced apart at regular intervals, without being limited to the above structure. Also, the uneven structure 125K may also be formed at the sidewall 124 and an inner bottom surface thereof, without being limited to the inside of the upper wall 125.

Thus, according to this configuration of the present disclosure, the uneven structure 125K of the connection slot 123 may contact or press one surface of the battery cell connection lead 148 of the inserted second terminal connection unit 145, thereby allowing a more reliable electrical connection.

Also, since the inner empty space of the connection slot 123 may lower the heat transfer rate, when a hot-pressing method or a bonding method such as welding is used, the heat added to the connection slot 123 may be effectively transferred to the second terminal connection unit 145 such that a portion of the connection slot 123 and the second terminal connection unit 145 are sufficiently melted, and thus the heating process may be performed efficiently, thereby ensuring a more reliable coupling.

Figure 7:
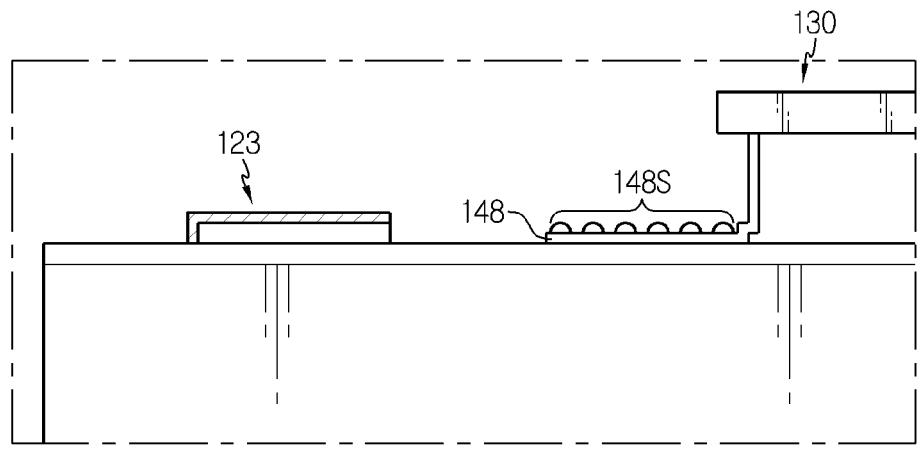
FIG. 7 is a cross-sectioned view showing a secondary battery pack according to still another embodiment of the present disclosure, which is sectioned in a lateral direction.

FIG. 7 is a cross-sectioned view showing a secondary battery pack according to still another embodiment of the present disclosure, which is sectioned in a lateral direction.

Referring to FIG. 7, protrusions 148S protruding upwards may be formed at the upper surface of the battery cell connection lead 148 of the second terminal connection unit 145.

The protrusions 148S may be made of the same material as the battery cell connection lead 148 or may be made of a material different from the connecting lead of the battery cell 110. For example, the protrusions 148S may be made of a metal material with high electrical conductivity.

Thus, according to this configuration of the present disclosure, the protrusions 148S formed at the battery cell connection lead 148 may contact or press the inner surface inside the connection slot 123, thereby ensuring a more reliable electrical connection.

Also, the inner empty space of the connection slot 123 may lower the heat transfer rate, but the protrusions 148S fills the empty space. Thus, when a hot-pressing method or a bonding method such as welding is used, the protrusions 148S may effectively transfer the heat added to the connection slot 123 to the battery cell connection lead 148 so that the connection slot 123 and the battery cell connection lead 148 may be sufficiently melted. Thus, the heating process may be efficiently carried out and a more reliable combination may be achieved.

Figure 8:
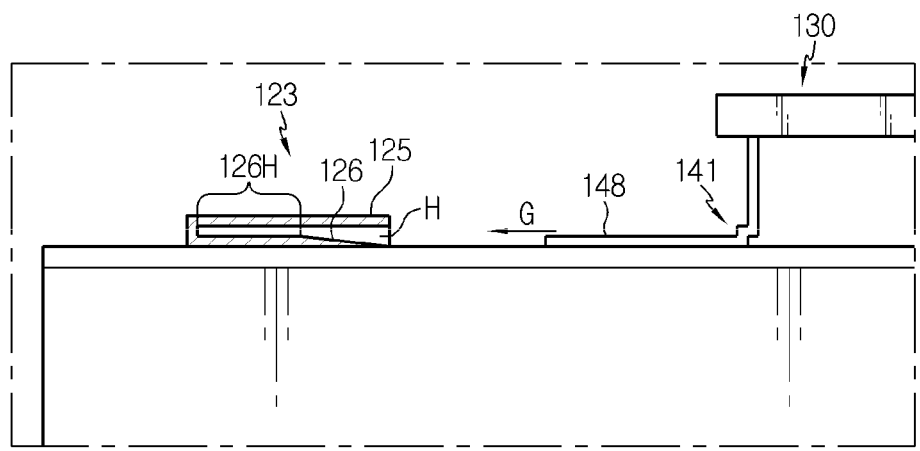
FIG. 8 is a cross-sectioned view showing a secondary battery pack according to still another embodiment of the present disclosure, which is sectioned in a lateral direction.

FIG. 8 is a cross-sectioned view showing a secondary battery pack according to still another embodiment of the present disclosure, which is sectioned in a lateral direction.

Referring to FIG. 8, a slope structure 126 may be formed at the inside of the connection slot 123. Specifically, the slope structure 126 may be configured such that the inner lower surface of the connection slot 123 is gradually increased in a G direction along which the battery cell connection lead 148 is inserted.

That is, as being inserted through the opening H of the connection slot 123, the battery cell connection lead 148 moves along the slope structure 126 and accordingly may contact, or be located adjacent to, the lower surface of the upper wall 125 of the connection slot 123.

In addition, a flat portion 126H having a predetermined length may be formed at an end portion of the slope structure 126 in the direction along which the battery cell connection lead 148 is inserted. A portion of the battery cell connection lead 148 may be located at the flat portion 126H, and the upper surface of the battery cell connection lead 148 located on the flat portion 126H may contact, or be located adjacent to, the lower surface of the upper wall 125 of the connection slot 123.

Thus, according to this configuration of the present disclosure, the lower surface and the upper surface of the battery cell connection lead 148 may be closely adhered to the inner surface of the connection slot 123 by means of the slot structure 126, thereby ensuring a reliable electrical connection and facilitating the high-quality coupling process.

Figure 9:
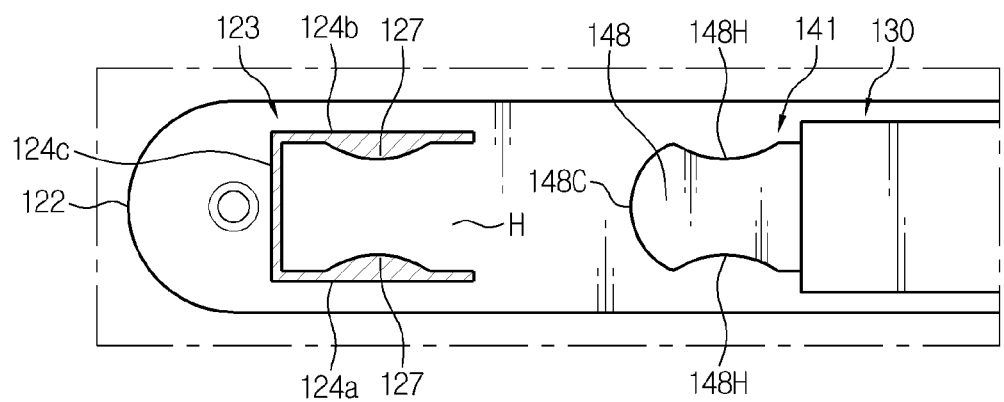
FIG. 9 is a plane view showing some components of the secondary battery pack according to still another embodiment of the present disclosure.

FIG. 9 is a plane view showing some components of the secondary battery pack according to still another embodiment of the present disclosure.

Figure 10:
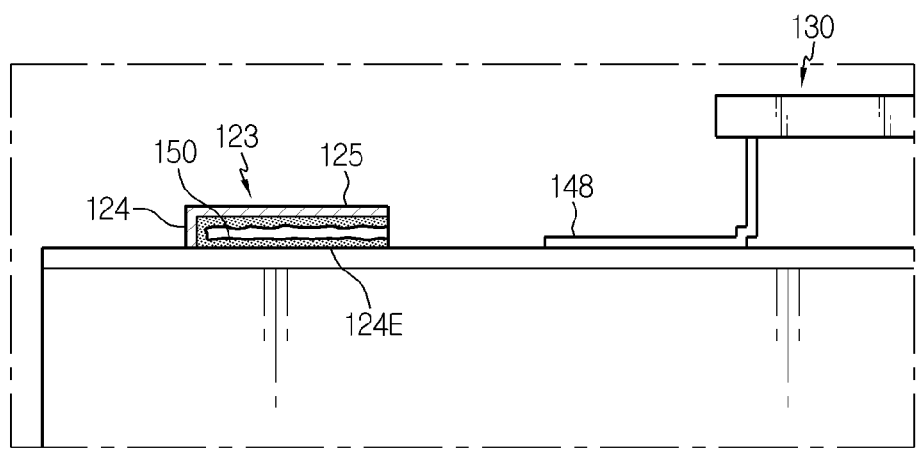
FIG. 10 is a cross-sectioned view showing a secondary battery pack according to still another embodiment of the present disclosure, which is sectioned in a lateral direction.

Referring to FIG. 9, a convex portion 127 may be formed at the inner surface of the sidewall 124 of the connection slot 123 to protrude toward a center (in the front and rear direction). For example, as shown in FIG. 10, two convex portions 127 protruding in the horizontal direction may be formed at the inner surfaces of the first sidewall 124a and the second sidewall 124b of the connection slot 123.

In addition, an inwardly concave hooking groove 148H may be formed at an outer circumference of the battery cell connection lead 148. That is, the convex portion 127 formed at the inner surface of the sidewall 124 of the connection slot 123 may be inserted and fixed in the hooking groove 148H formed at the outer circumference of the battery cell connection lead 148.

Accordingly, the battery cell connection lead 148 may be inserted into the connection slot 123 and simultaneously fixed by the fastening structure of the convex portion 127 and the hooking groove 148H.

Thus, according to this configuration of the present disclosure, the protection circuit module 130 may be easily mounted at a correct position by the coupling structure of the convex portion and the hooking groove that couple the connection terminal 123 and the second terminal connection unit, and during the coupling process, it is possible to prevent the inserted battery cell connection lead 148 from escaping from the connection slot 123 in advance, thereby facilitating the coupling process.

Also, at least a portion of the outer circumference of the battery cell connection lead 148 may include a curve 148C, and the hooking groove 148H may be formed to be connected to the curve 148C. The curve 148C formed at the outer circumference of the battery cell connection lead 148 may prevent the phenomenon that the battery cell connection lead 148 is not easily inserted due to interference of the convex portion 127.

Moreover, the battery cell connection lead 148 may be connected to the inner surface of the connection slot 123 by hot-pressing or welding. Accordingly, the battery cell connection lead 148 may be electrically and mechanically connected to the connection slot 123 by hot-pressing or welding.

Here, the hot-pressing may be a process of squeezing the upper portion of the connection slot 123 into which the battery cell connection lead 148 is inserted, by using a compression block prepared in a high-temperature state. At this time, the connection slot 123 and the battery cell connection lead 148 may be fused and bonded to each other by being pressurized at a high temperature.

The welding may be accomplished in a variety of ways, for example, resistance welding, ultrasonic welding, laser welding, and the like.

FIG. 10 is a cross-sectioned view showing a secondary battery pack according to still another embodiment of the present disclosure, which is sectioned in a lateral direction.

Referring to FIG. 10 along with FIG. 5, the inner surface of the connection slot 123 and the battery cell connection lead 148 may be fixed by means of a conductive adhesive material 150. The conductive adhesive material 150 may be, for example, an adhesive resin including metal powder with high electrical conductivity.

In addition, the conductive adhesive material 150 may be applied to at least one of the lower surface of the upper wall 125, the inner surface of the sidewall 124 and the inner lower surface 124E of the connection slot 123. The conductive adhesive material 150 may be cured in a state where the battery cell connection lead 148 is inserted.

Thus, according to this configuration of the present disclosure, the conductive adhesive material 150 may fix the inserted battery cell connection lead 148 and also electrically connect the body plate 122, substantially connected to the second electrode terminal 112, and the battery cell connection lead 148.

Meanwhile, even though the terms indicating directions such as upper, lower, left, right, front and rear directions are used in the specification, it is obvious to those skilled in the art that these merely represent relative locations for convenience in explanation and may vary based on a location of an observer or an object.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A secondary battery pack, comprising:
   a battery cell having an electrode assembly sealed in a battery case together with an electrolyte, the battery cell having first and second electrode terminals at a top end thereof;
   a protection circuit module having a protection circuit board at which a protection circuit is provided, and first and second battery cell connection terminals at a lower surface of the protection circuit board;
   a first terminal connection unit having one end connected to the first electrode terminal of the battery cell, and the other end contacted and electrically connected to the first battery cell connection terminal of the protection circuit module; and
   a second terminal connection unit having a proximal end contacted and electrically connected to the second battery cell connection terminal of the protection circuit module, a support portion extending vertically downwards from the proximal end, and a battery cell connection lead extending horizontally from the support portion, wherein the battery case includes a battery can having an open top portion into which the electrode assembly is inserted, and a cap assembly coupled to the open top portion of the battery can, wherein the cap assembly includes a body plate, and a connection slot, the connection slot including:
  two electrically conductive sidewalls each of whose lower portion is connected to a top surface of the body plate to define a horizontal opening of the connection slot between the two electrically conductive sidewalls, and
  an electrically conductive upper wall connected to top ends of the two sidewalls such that the horizontal opening is defined below the electrically conductive upper wall, wherein the battery cell connection lead of the second terminal connection unit is horizontally inserted and accommodated in the horizontal opening of the connection slot between and in contact with the upper wall and the body plate to be electrically connected to the second electrode terminal,
wherein each of the two conductive sidewalls has a respective inner surface facing the horizontal opening and a respective outer surface on an opposite side facing away from the horizontal opening such that the inner surface of each of the two conductive sidewalls contacts the second terminal connection unit, and
wherein the battery cell connection lead includes convex protrusions protruding upwards from an upper surface of the battery cell connection lead to contact an inner lower surface of the upper wall of the connection slot.

2. The secondary battery pack according to claim 1, wherein the body plate is an electrically conductive metal plate,
wherein the two sidewalls and the upper wall are integral, and
wherein the connection slot is integral with the body plate of a same material of the body plate.

3. The secondary battery pack according to claim 1, wherein the first electrode terminal has a protruding structure protrusively extending through the body plate and is electrically insulated from the body plate, and
  wherein the second electrode terminal includes the top surface of the body plate and the connection slot.

4. The secondary battery pack according to claim 1, wherein the second terminal connection unit includes:
  a horizontal protection circuit module (PCM) connection lead contacted and electrically connected to the second battery cell connection terminal of the protection circuit module;
  the support portion vertically bent downwards from an end of the PCM connection lead; and
  the battery cell connection lead bent from the support portion and extending horizontally to be inserted through the opening of the connection slot.

5. The secondary battery pack according to claim 4, wherein the battery cell connection lead is connected to an inner surface of the connection slot by hot-pressing or welding.

6. The secondary battery pack according to claim 4, wherein an inner surface of the connection slot and the battery cell connection lead are fixed by a conductive adhesive material.

7. The secondary battery pack according to claim 1, wherein the second electrode terminal includes the body plate and the connection slot.

8. The secondary battery pack according to claim 1, wherein each of the two electrically conductive sidewalls has a curved convex inner surface in contact with the battery cell connection lead, and
  wherein, in a top plan view, the battery cell connection lead has outer surfaces each defining an inwardly curved concave surface and being in contact with a respective curved convex inner surface of the two electrically conductive sidewalls.

9. The secondary battery pack according to claim 8, wherein the battery cell connection lead has a curved distal end.

* * * * *